Aug. 21, 1962  F. L. CLAPP  3,049,829
POWER DRIVEN FISHING TACKLE
Filed Sept. 1, 1961

INVENTOR.
Fred L. Clapp
BY
David Rabin
ATTORNEY

United States Patent Office

3,049,829
Patented Aug. 21, 1962

3,049,829
POWER DRIVEN FISHING TACKLE
Fred L. Clapp, 1008 Fairmont St., Greensboro, N.C.
Filed Sept. 1, 1961, Ser. No. 135,490
7 Claims. (Cl. 43—6.5)

This invention relates to power-operated fishing tackle and more particularly to a fishing rod and motor-driven reel apparatus for deep sea and game fishing in which the apparatus may be suitably supported for rotation.

Electric power-driven fishing reels have been employed previously in which the reel in driven by various linkages and mechanisms to permit the free utilization of a movable long pole fishing rod. The principal objective of many of these prior devices has been merely to drive the reel by means of electricity. However, by the time the necessary components are assembled on a rod it becomes extremely difficult and physically exhausting to manipulate a freely movable rod for prolonged periods of time, and particularly when employed for commercial rather than fishing for sport. It is also extremely difficult for one person to manage or attend to more than a single line when employing a pole-type movable fishing rod of the conventional type despite the fact that rod-supporting sockets and other appurtenances are employed aboard fishing boats.

Therefore, this invention contemplates the provision of a fishing apparatus in which the fishing tackle may be anchored to a suitable base, such as the deck of a boat, and an electrically-powered reel is supported for reeling a line that is flexibly guided in close proximity to the reel.

Another objective of this invention is to provide a fishing assembly having a motor-operated reel supported for movement in a substantially horizontal plane in which electrical energy is obtained from a suitable source of supply, such as a storage battery, and reeling brake means will control the speed of reel rotation and line slack.

Another objective of this invention is to provide a fishing apparatus in which a fisherman may control the operation of a number of fishing lines simultaneously within a small area on a boat without encountering any physical fatigue while reeling in fish.

A further objective of this invention is to provide a relatively short resilient rod member for flexibly supporting a line in direct alignment with a motor-driven reel that is rotatably supported on a mounting with the rod member.

Yet another objective of this invention is to provide a motor-driven reel with a manually-controlled reel-braking means.

Other objectives and many of the attendant advantages of this invention will become more readily apparent to those skilled in the piscatory art from the following detailed description taken in conjunction with the accompanying drawing in which like characters of reference designate corresponding parts throughout the several views, and wherein.

Figure 3:
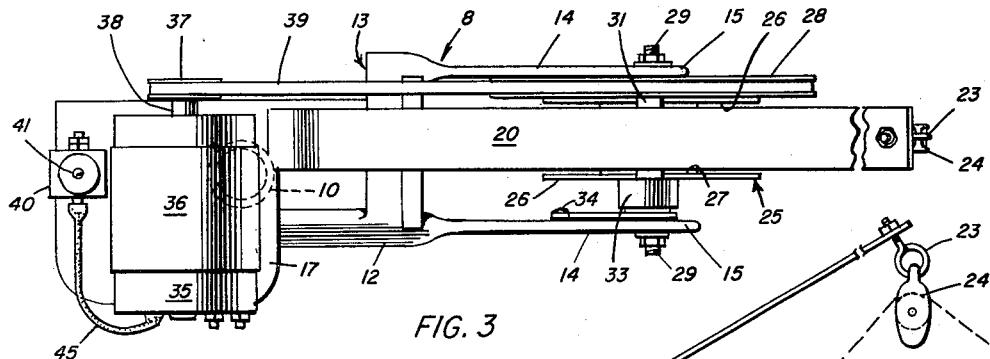
FIG. 3 is a top plan view of the fishing apparatus of FIG. 2.
Figure 2:
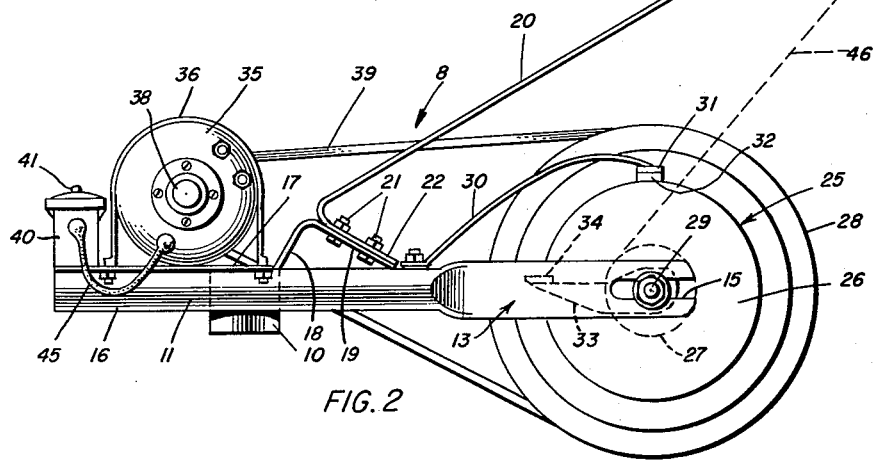
FIG. 2 is an enlarged side elevational view of the fishing apparatus of FIG. 1, omitting the stanchion.
Figure 1:
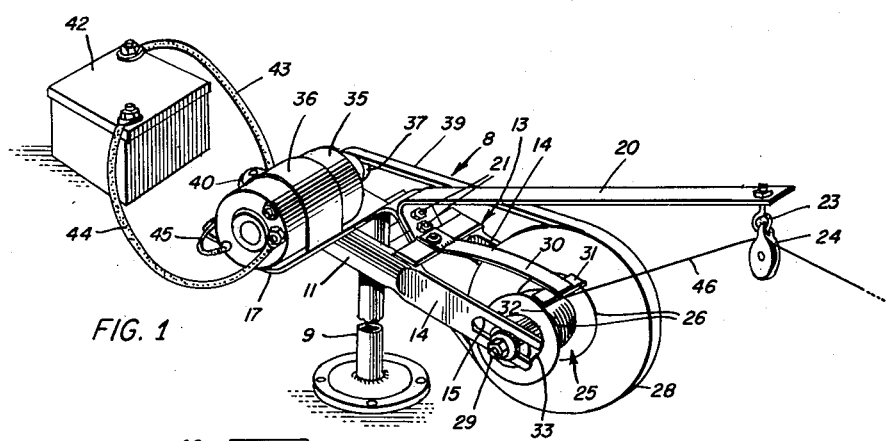
FIG. 1 is a perspective view of the fishing apparatus of this invention illustrating the power-driven reel and associated rod member mounted on a stanchion connected to a source of electrical energy for operating the electric motor drive.

Referring now to the drawing and particularly to FIGS. 1, 2 and 3, there is shown a fishing apparatus 8, supported intermediate its length on a stanchion base 9 that is bolted to a boat deck at the bottom end and the top end is cooperatively received in the stanchion-receiving socket 10, in which apparatus the supporting frame 11 extends forwardly from the medial section 12 to form a bifurcated section or yoke 13 having a pair of laterally-spaced apart parallel arms 14. Each of the arms 14 has a terminal end shaft-receiving slot 15. The rearwardly extending section 16 of the frame has a motor-receiving base plate 17 mounted thereon by suitable means, such as welding. A bracket 18 is securely fastened to the frame 11 on the upper side of the medial portion of the frame and is provided with a rod member-receiving inclined surface 19. A flat resilient spring steel rod member 20 is securely fastened to the bracket 18 by means of the bolts 21 which are passed through the terminal end 22 of the rod member which has a return bend therein corresponding to the bracket inclined surface 19. A pulley-receiving eyebolt 23 is fastened to the other terminal end 24 of the relatively short rod member 20 for retaining the line guide pulley 24.

A line reel 25, having a line-winding drum 27 against the ends of which are a pair of laterally spaced-apart flanges 26, and a V-belt-receiving pulley 28 are coupled together and mounted for rotation on shaft 29 that is securely supported in the shaft-receiving slots 15 in the arms 14 of the frame. A spring-arm 30 is fastened at one end to the medial section of the frame and the free end has a crosshead 31 mounted thereon. Beneath the crosshead 31 is a friction bank 32, of leather or rubber, which contacts the periphery of the reel flanges 26 in order to retard rotation of the reel to an extent depending upon the pressure exerted by the spring arm 30. Arm 30 may be suitably biased to exert the desired degree of braking action necessary on the reel depending upon the desired slack or force exerted by a fish. The auxiliary braking action generated by the arm 30 may be eliminated merely by raising the crosshead 30 out of contact with the flanges so that the drag imposed results only from the resistance to rotation of the armature shaft and other rotatable components.

A conventional coaster brake mechanism and brake arm 33 of the type generally employed on the rear wheels of bicycles, which mechanism may be of the New Departure or similar construction, is mounted on the shaft 29 and is housed within the winding drum 27. A lug 34 is securely fastened to the inside of one arm 14 to engage and prevent rotation of the brake arm 33.

Figure 4:
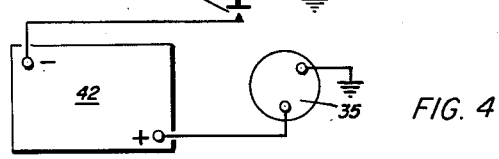
FIG. 4 is a diagrammatic illustration of the electrical circuit employed in the fishing apparatus of this invention.

An electric motor 35 is mounted in the cradle formed by the frame plate 17 with a motor housing encircling band 36 being bolted to the plate 17. Driving pulley 37 is fastened on the projecting end of the motor armature shaft 38. A V-belt flexible connector 39 encircles pulleys 28 and 37 to transmit rotation from the motor shaft to the reel. A motor-operating switch 40 having a conventional spring-operated push button 41 is mounted adjacent the motor or at some other convenient location to the operator, and is electrically connected in the circuit to control motor operation. In the embodiment illustrated, a standard 6 or 12 volt storage battery 42 will supply sufficient electrical energy to operate the motor 35 through battery conductors 43 and 44 in conjunction with the jumper line 45 that extends to complete the electrical circuit from the switch 40 to the motor terminals. The electrical circuit is diagrammatically shown in FIG. 4.

Although either a 6 or 12 volt storage battery may be employed with very satisfactory results, motors of other voltage ratings may be employed depending upon the available voltage on the fishing vessel as some boats are equipped with an electric generator and direct connection may be made between the electric generator to the motor.

In operation, the line 46 may be dropped for bottom fishing, cast or, in trawling, the line may be pulled through the water by the boat with as much line being released as necessary. Line may readily be released simply by raising brake arm 30 sufficiently to have it become disengaged from the periphery of flanges 26 and sufficient drag may be imposed on the line merely from the other rotating elements. As more line is released the reel and pulley 28 will revolve in a clockwise direction. For reeling the line in, the operator need only depress the push button 41 on switch 40 thereby closing the electrical circuit to start the motor which in turn will rotate the motor shaft and pulley which in turn will revolve the reel through the V-belt in a counterclockwise direction.

Many modifications and variations may be made to the positioning of the various components in this fishing apparatus without departing from the spirit of this invention and the use of various mechanical equivalents for achieving a suitable power-operated fishing apparatus is contemplated within the scope of the appended claims.

What is claimed is:

1. A power-operated fishing apparatus comprising a motor and reel-supporting frame having a yoke at one end thereof and a motor-supporting base at the other end, a stanchion-supporting socket intermediate the frame and a stanchion mounted in said socket for supporting the motor and reel frame for horizontal movement at a suitable elevation, a flat resilient rod member securely mounted intermediate the frame at one terminal end of the rod member, said member reaching upwardly at an acute angle from the frame and having a line-supporting and guide pulley swivelly supported at the other terminal end thereof, a shaft supported in said yoke, a reel-driving pulley and reel rotatably mounted on said shaft and cooperatively connected to each other, friction brake means mounted on the frame releasably engaging the reel for controlling the speed of rotation of the pulley and reel, a motor and switch mounted on the frame motor supporting base, said motor having a shaft and a driving pulley mounted thereon, a flexible connector encircling said reel-driving and said motor mounted pulleys for transmission of rotary movement of the motor mounted driving pulley to the reel during pulley rotation, and a storage battery electrically connected to said motor and switch for supplying electrical energy to said motor.

2. A power-operated fishing apparatus comprising a motor and reel-supporting frame having a stanchion-supporting socket intermediate the frame and a stanchion mounted in said socket for supporting the frame for horizontal rotation at a suitable elevation, a flat relatively short resilient rod member securely mounted on the frame and at one terminal end of the rod member, said member reaching upwardly at an acute angle from the frame and having a line supporting pulley swivelly mounted on the other terminal end of the rod member, a shaft supported on said frame, a reel-driving pulley and reel rotatably mounted on the shaft and cooperatively connected to rotate together, friction brake means resiliently mounted on the frame for releasably engaging the reel to control the rotation thereof, a motor mounted on the frame, said motor having a shaft and a reel-driving pulley mounted thereon, means for transmitting rotation from the driving pulley to the reel connected pulley, and a storage battery electrically connected to the motor for supplying electrical energy to said motor for rotating said reel.

3. A power operated fishing apparatus comprising a frame having a yoke at one end thereof and a motor supporting base at the other end, a stanchion for supporting the frame for rotation in a horizontal plane, a flat relatively short resilient rod member mounted on the frame, said member reaching upwardly at an acute angle from the frame and having a line supporting pulley swivelly supported at the terminal end thereof, a shaft supported on said yoke, a reel-driving pulley and reel connected together to rotate on the shaft, brake means mounted on the frame resiliently engaging the reel for controlling the rotation thereof, a motor on the frame, said motor having a shaft and a pulley mounted thereon, a belt connecting said reel-driving and said motor shaft mounted pulleys for transmitting rotary motion from the motor shaft to the reel during pulley rotation, and means for supplying electrical energy to said motor.

4. A fishing apparatus comprising a motor and reel-supporting frame having a pair of forwardly extending parallel arms and a motor-supporting rearwardly extending base, a stanchion-supporting socket on the frame and a stanchion mounted in said socket for supporting the frame for rotation in a horizontal plane, a flat flexible rod member securely mounted on the frame extending upwardly at an acute angle from the horizontal, said member having a tackle line guide pulley swivelly supported at the terminal end thereof, a reel-driving pulley and reel connected together and revolvably mounted between said parallel arms, brake means mounted on the frame for engaging and controlling the rotation of the reel, a motor mounted on the frame base, said motor having a shaft and a driving pulley thereon, and a belt encircling the pulleys for transmitting rotary motion of the driving pulley to the reel during pulley rotation.

5. A power-driven fishing apparatus comprising a motor, a reel and rod-supporting frame, a reel and reel-driving pulley connected together for rotation on said frame, means for swivelly supporting said frame for rotation in a horizontal plane, a motor and means for controlling the supply of electrical current to said motor operatively mounted on the frame, said motor having a shaft and a pulley mounted thereon, a flexible reel controlling brake mounted on the frame and engaging said reel, a flexible belt connecting said pulleys for driving said reel, and a flexible flat spring rod member having a line guide pulley thereon mounted on said frame.

6. A power-operated fishing apparatus comprising a motor, reel and rod-supporting frame, a shaft mounted on said frame, a reel and pulley coupled together for rotation on said shaft, a motor and means for controlling said motor operatively mounted on the frame, said motor having a shaft and a pulley mounted thereon, a flexible brake mounted on the frame for engaging and controlling the rotation of said reel, a flexible belt connecting said pulleys for rotating said reel, a flexible flat spring rod member having a line guide pulley thereon mounted to project obliquely from said frame, and means for supplying electrical energy to said motor.

7. A power-operated fishing apparatus comprising a frame, a reel and reel-driving pulley coupled together and revolvably mounted on said frame, means for swivelly supporting said frame for rotation in a horizontal plane, a motor mounted on the frame, said motor having a shaft and a pulley thereon, flexible reel braking means on the frame engaging said reel, means for rotating said pulleys for driving said reel, and a relatively short flexible flat spring member having line guide means thereon mounted on said frame, and a battery for supplying electrical energy to the motor.

References Cited in the file of this patent
UNITED STATES PATENTS

| | | |
|---|---|---|
| 369,622 | Titus | Sept. 6, 1887 |
| 1,843,714 | Fuller | Feb. 2, 1932 |
| 2,569,390 | Sewell | Sept. 25, 1951 |
| 2,743,067 | Stratton | Apr. 24, 1956 |
| 2,896,875 | Reed et al. | July 28, 1959 |
| 2,959,396 | Lawrence | Nov. 8, 1960 |